5 Sheets. Sheet 1.

E. Andrews,

Grinding Saws.

No. 2,290.

Reissued June 19, 1866.

Witnesses:
John P. Craighead.
W. L. Benson.

Inventor:
Emanuel Andrews.
by his Attorney
E. S. Renwick.

5 sheets-Sheet 2.
E. Andrews,
Grinding Saws.
No. 2,290.
Reissued June 19, 1866.
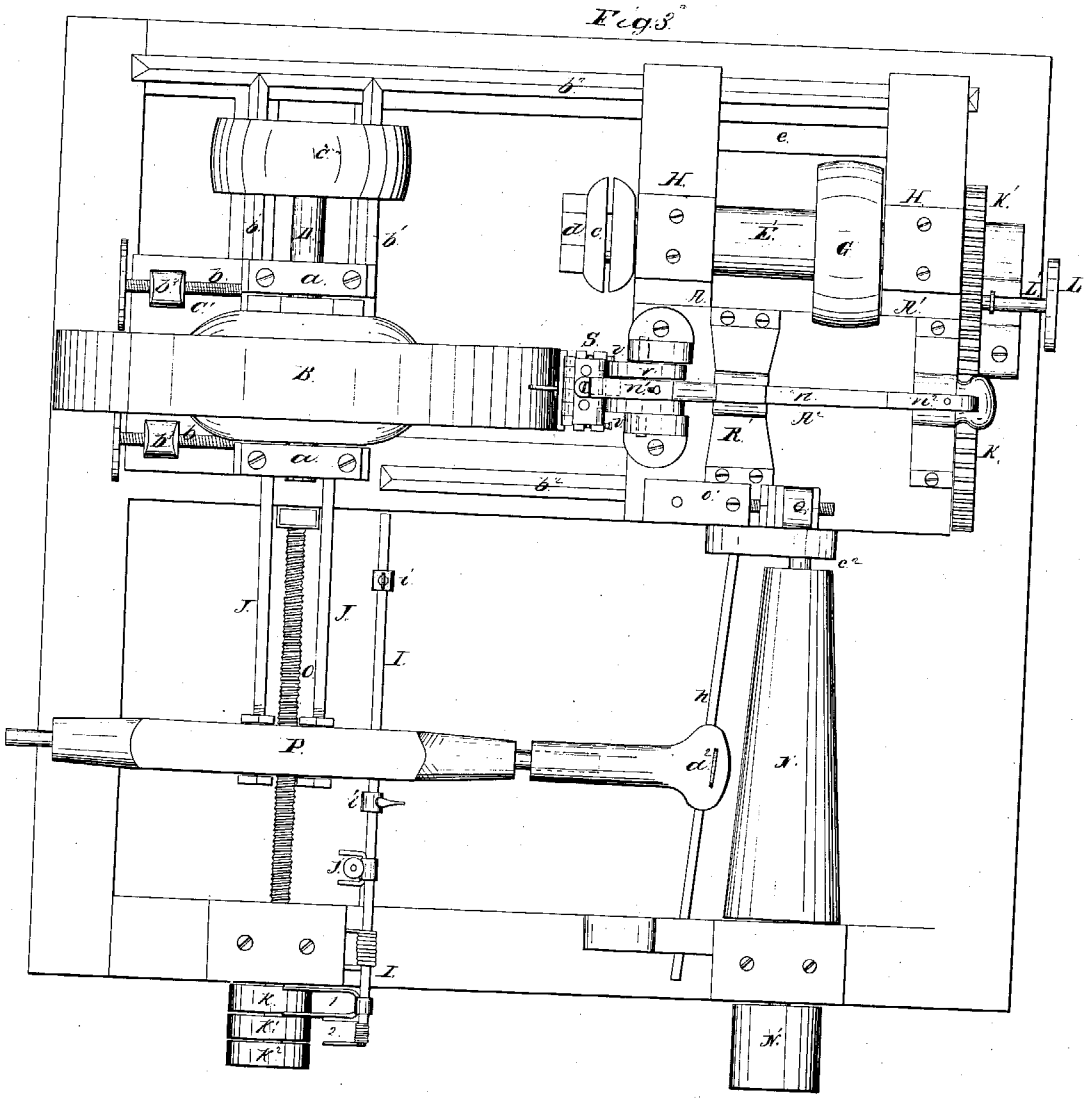
Witnesses:
John P. Cranghead.
H. L. Bennett.
Inventor:
Emanuel Andrews.
by his Attorney
E. S. Renwick 5 Sheets-Sheet 3.

E. Andrews,

Grinding Saws.

No. 2,290. Reissued June 19, 1866.

Witnesses:
John P. Craighead
W. C. Bennett.

Inventor:
Emanuel Andrews
by his Attorney
E. S. Renwick

5 Sheets-Sheet 4.
E. Andrews,
Grinding Saws.
No. 2,290
Reissued June 19, 1866.
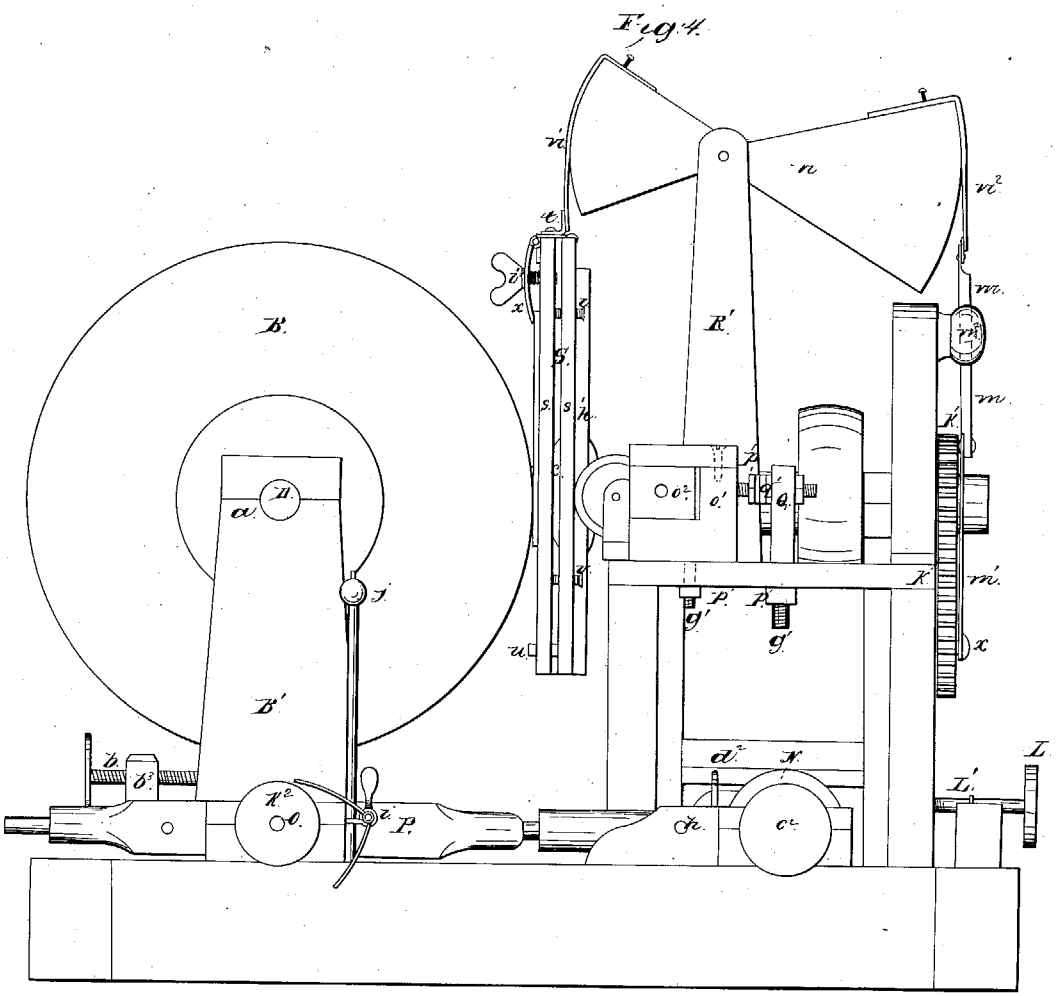
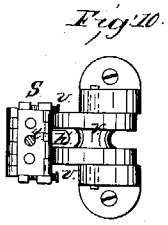
Witnesses:
John P. Wright
W. L. Bunnem.
Inventor:
Emanuel Andrews
by his Attorney,
E. S. Renwick.

5 Sheets-Sheet 5.

E. Andrews,

Grinding Saws.

No. 2,290. Reissued June 19, 1866.

Witnesses
John P. Crawshead
W. L. Benson.

Inventor:
Emanuel Andrews
by his Attorney
E. S. Renwick.

UNITED STATES PATENT OFFICE.

EMANUEL ANDREWS, OF WILLIAMSPORT, PENNSYLVANIA.

IMPROVEMENT IN MACHINES FOR GRINDING SAWS.

Specification forming part of Letters Patent No. 16,223, dated December 16, 1856; Reissue No. 2,290, dated June 19, 1866.

*To all whom it may concern:*

Be it known that I, EMANUEL ANDREWS, formerly of Elmira, in the State of New York, now of Williamsport, in the State of Pennsylvania, did invent a new and Improved Machine for Grinding Saws and other Articles; and I do hereby delare that the following is a full, clear, and exact description of the same, reference being had to the accompanying drawings, in which—

Figure 1:
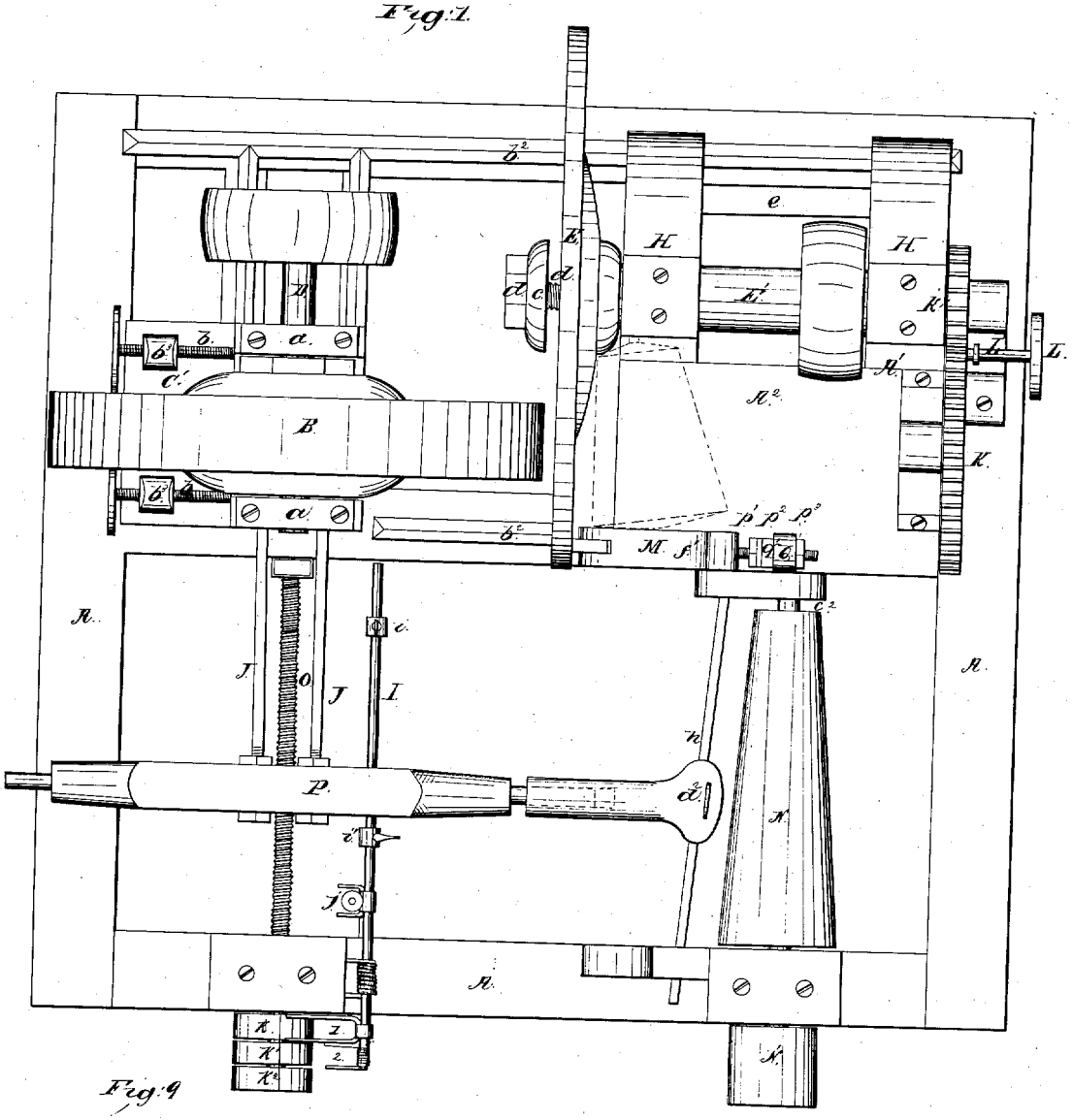
Figure 3:
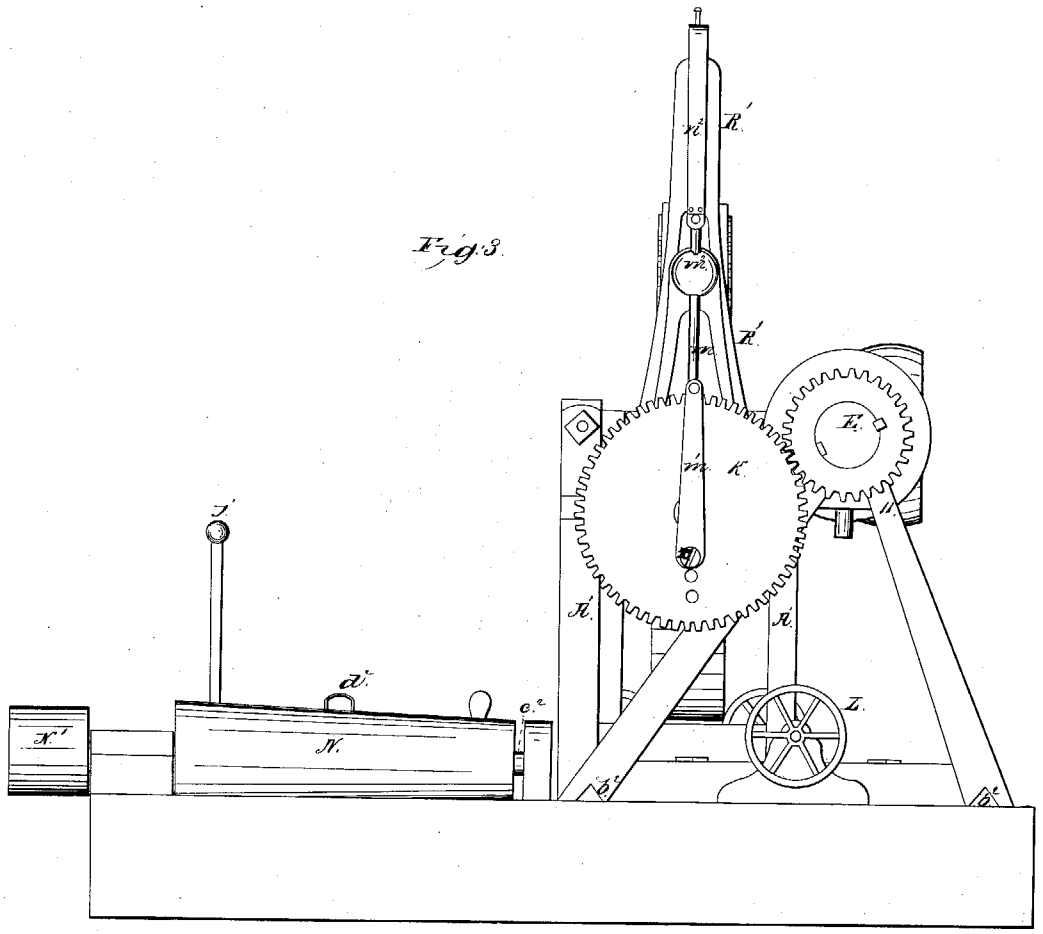
Figure 5:
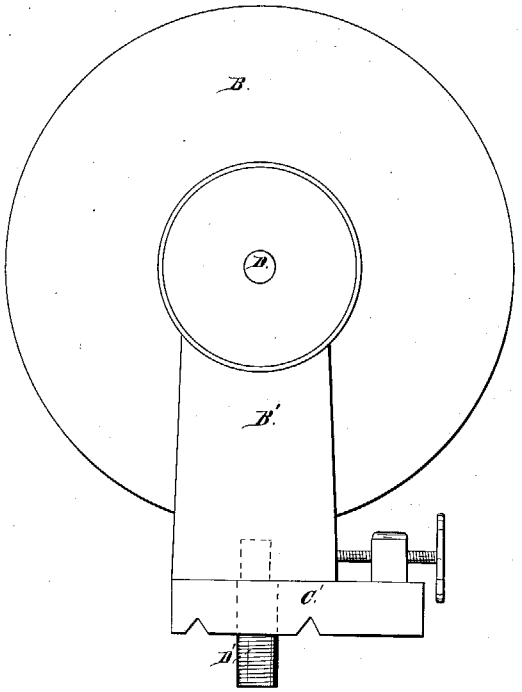
Figure 6:
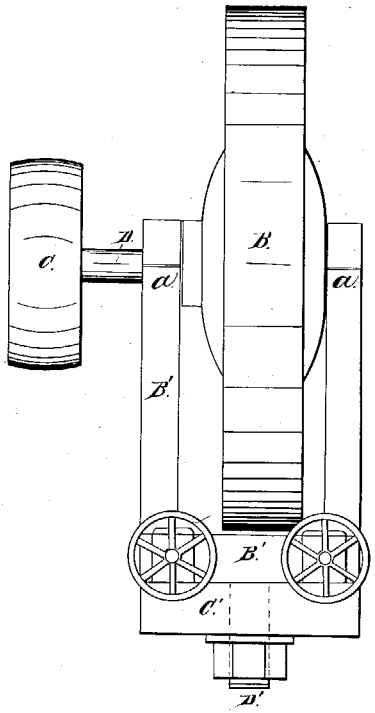

Figure 1 represents a plan of a machine constructed according to my invention, and arranged with a face-plate for grinding circular saws. Fig. 2 represents a plan of the same arranged for grinding straight saws. Fig. 3 represents an end view of the same. Fig. 4 represents a side view of the same. Figs. 5 and 6 represent views of the revolving grinder and its carriage, and Figs. 7, 8, 9, and 10 represent views of certain parts of the machine detached from the remainder.

The objects of the invention are to bear the article to be ground automatically against the grinder with a yielding pressure; to obviate the friction of the article (or the holder which supports it) against the yielding bearing; to turn the grinder in different planes, so as to change the relation of its grinding-rim to the article; to support the article and present it to the grinder in such manner that different parts of it shall be ground of different thicknesses, according to a predetermined plan, and to cause the grinder to move sidewise along the surface of the article to be ground more or less rapidly, as less or more of the material is to be ground away.

My invention consists of sundry combinations of instrumentalities constituting its parts, and the first of these parts consists of the combination of a revolving grinder, a roller-bearing to bear the article against the grinder, and a spring, the whole operating in such manner that the article inserted between the grinder and the roller is borne against the grinder with a yielding pressure. The roller and spring which constitute members of this combination may be either separate instrumentalities or may be combined so as to form a compound instrument having the functions of both roller and spring.

The second part of the invention consists of the combination of a revolving grinder, a bearing or support for the article to be ground, and a turning frame for the grinder, so that the grinder may be turned crosswise to its plane of revolution to vary the relation of its rim to the article upon which it is acting.

The third part of the invention consists of the combination of a revolving grinder and a traversing carriage for the same with a bearing to support the article against the grinder and mechanism to move the grinder along the surface of the article with varying speed.

The fourth part of the invention consists of the combination of a revolving grinder, a bearing to bear the article against the grinder, and a pattern-holder for the article, varying in thickness at different parts of its length, so that the passage of the said holder and the article between the bearing and the grinder causes the article to be ground thinner at that part of its length where the holder is thicker, and vice versa.

The fifth part of the invention consists of the combination of a revolving grinder, a bearing to bear the article against the grinder, and a pattern-holder for the article varying in thickness at different parts both of its length and breadth, so that the passage of the said holder and the article between the bearing and the grinder causes the article to be ground of different thickness at different parts, both lengthwise and crosswise.

The sixth part of the invention consists of the combination of the revolving grinder and the bearing to bear the article against the same with a pattern-holder for the article adjustable in thickness in the direction of its length, so that the same pattern-holder may be used to grind articles of different varying thicknesses lengthwise by adjusting the holder to the particular longitudinal varying thickness of the article to be ground.

The seventh part of the invention consists of the combination of the revolving grinder and the bearing to bear the article against the same with a pattern-holder for the article adjustable in thickness in the direction of both its length and breadth, so that the same pattern-holder may be used to grind articles of different varying thicknesses both lengthwise and crosswise, or either, by adjusting the holder to the particular varying thickness of the article to be ground.

The eighth part of the invention consists of the combination of a revolving grinder, a bearing to bear the article against the grinder, and a pattern-holder (either adjustable or not) with a spring to maintain a yielding pressure upon the article during grinding.

The ninth part of my invention consists of the combination of a revolving grinder, a bearing to bear the article against the same, a pattern-holder, a spring to maintain a yielding pressure upon the article during grinding, and mechanism to move the said pattern-holder past the grinder.

The machine represented in the accompanying drawings is constructed to grind circular saws and straight saws or similar articles. When used to grind circular saws it is arranged as represented at Fig. 1, and when used to grind straight saws or similar articles it is arranged as represented at Figs. 2, 3, and 4.

The grinder or stone B is mounted on a shaft, D, which is supported in the bearings *a a* of a frame, B′, that is secured to a sliding carriage, C′, by means of a pivot, D′. This pivot permits the grinder to be turned in different planes to change the relation of its rim to the article to be ground.

The grinder-carriage C′ is constructed to slide upon V-formed ways *b′ b′*, secured to the frame A of the machine, and is connected by rods J J with an arm, P, having a screw-nut in it that is traversed by a feed-screw, O, which turns in bearings in the frame of the machine, so that by turning said screw the carriage and grinder are moved to and fro upon the ways *b′ b′*. The grinder-shaft is fitted with a belt-pulley, C, to which the belt that imparts motion to the grinder is applied.

When a circular saw is to be ground it is supported opposite the rim of the grinder upon a mandrel, E′. This mandrel is supported in bearings H H, connected by a brace, *e*, and a platform, $A^2$, so as to form a frame, A′. This frame is arranged to slide on V-formed ways $b^2$ $b^2$ toward and from the rim of the grinder, so that the article to be ground may be adjusted or fed against the grinder, and the frame is moved by a screw whose shank L′ is fitted with a hand-wheel, L, by which it may be turned. The mandrel is fitted with a belt-pulley, G, to which a belt is applied to cause it to revolve.

The circular saw may be supported upon a face-plate secured to the mandrel E′, or it may be supported by a conical roller without a face-plate. In the former case the circular face-plate E is secured to the mandrel by means of a screw cut on the end of the same and a worm in the face of the plate, or by any equivalent means, and the saw to be ground is placed upon the mandrel and firmly secured by a collar, *c*, and screw *d*, or their equivalents.

Figure 7:
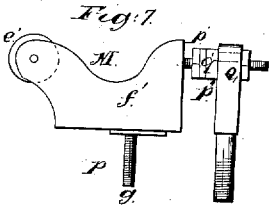

In order to bear the saw against the grinder with a yielding pressure, and at the same time to diminish the friction upon the bearing, a yielding-roller bearing, M, Figs. 1 and 7, is applied behind the face-plate near its peiriphery. This bearing consists of a roller, *e′*, supported on a pivot in a stock, *f′*, which is fitted with an adjustable screw that passes through a hole in a post, Q, erected upon the movable frame A′. A nut and washer, *p′* $p^2$, are applied to the adjusting-screw, and a block of india-rubber, *q′*, is inserted between the washer $p^2$ and the post to form a spring, which forces the roller-bearing against the face-plate with a yielding pressure.

The greater or less pressure of the bearing is regulated by the nut, and the range of movement by the spring is limited by a second nut, $p^3$, at the back of the standard Q. The stock *f′* is prevented from rising from the sliding frame by means of a screw, *g′*, which passes down through a slot in the platform of the frame, and is provided with a nut, *p*, at the under side thereof.

Figure 9:
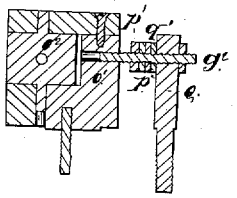
Figure 8:
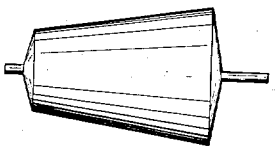

In case the conical roller is used to support the saw, it is made as represented at Fig. 8, and is supported in the position in which it is represented in red lines in Fig. 1, the journal at its smaller end being supported in one of the uprights H of the movable frame A′, and the journal at its larger end being supported in a bearing, $o^2$, Figs. 9 and 4, which turns on a pivot in a stock, *o′*, that is substituted in place of the stock *f′* and is borne up against the article by a screw, $g^2$, and nut *p′*, with blocks of india-rubber *q′*, constituting a spring between the nut and the post Q of the frame A′, to produce the desired yielding pressure.

The stock *o′* is retained upon the platform of the frame A′ by a nut, *p*, beneath the same, applied to a screw, *g′*, that projects downward from the stock through a slot in the platform. In this case the conical roller and spring constitute the yielding-roller bearing by which the saw is borne against the grinder, the roller yielding by oscillating on the journal at its smaller end as a center; and, if the pressure be increased sufficiently by screwing up the nut *p′*, the saw may be ground tapering.

The grinder-frame B′ is arranged to turn upon a pivot, as before described, so that the relation of the rim or edge of the grinder to the article may be varied by turning the frame on its pivot, the effect of which is to vary its plane of revolution and change the angle it forms with the face of the article it operates upon. This turning is effected in the present machine by means of two set-screws, *b b*, which pass through nuts formed in lugs $b^3$ $b^3$, secured to the sliding grinder-carriage C′, and bear against the base of the frame B′. By turning these screws so that their ends protrude equal distances from the lugs, the grinder will be set at a right angle to the face-plate, and consequently will cut the whole breadth of its cutting-surface; but by turning one of the screws backward and the other forward the angle formed by the grinder with the article will be changed and a portion of the stone only will be presented to the article. Other means than the screws may be used for turning the grinder B.

The grinder is moved along the surface of the saw or other article borne against it by turning the feed-screw O. In order that this movement may be made with varying speed, so as to cause the grinder to act for a longer period on that part of the article which requires the most grinding, the feed-screw is combined with a counter-shaft, $c^2$, driven by reversed cone-pulleys. One of these pulleys is applied to the driving-shaft from which the power is taken. The other, N, is secured to the counter-shaft $c^2$, that runs in bearings secured to the main frame of the machine. The belt is shifted along the cone-pulley N, so as to vary its speed of revolution by the end of the arm P, which carries a belt holder, $d^2$, through which the belt is passed, and is moved with the grinder by the screw O. The end of this arm P is caused to move parallel with the face of the cone-pulleys by means of a guide-rod, $h$, which it traverses, so as to keep the belt-holder $d^2$ uniformly close to the pulley. As the end of the arm follows the cone-pulley, it is necessary that the arm should accommodate its length to the change in the position of its end. For this purpose the arm is made in two parts, one of which has a round tenon, which is let into a mortise in the other part, thus allowing the arm to contract or expand in length as it traverses the rod $h$.

The driving belt is passed through the belt-holder on the end of the arm P, and as the arm is moved toward the base of the cone the belt is carried with it, thus gradually decreasing the speed of the pulley N. The shaft of the cone-pulley is provided with a belt-pulley, N′, which is connected by two belts with three pulleys, $k$ $k'$ $k^2$, upon the shaft of the screw O. Two of these pulleys, $k$ $k^2$, are fast to the screw-shaft. The intermediate pulley, $k'$, is loose upon it. One of the belts is crossed, the other is straight, so that the screw O is caused to revolve at the same speed as the conical pulley N, and in one direction or the other, according as the crossed or straight belt is running upon a fast pulley. The belts are shifted by means of forked belt-shippers 1 and 2, which are secured to a shifting-rod, I. This rod is fitted with two movable collars, $i$ $i'$, which may be secured in any desired positions by thumb-screws, so that when the arm P in its movement comes in contact with either collar it will move the shifting-rod to tranship the belts. The movement of the shifting-rod is completed by a tumbling-bob, $j$, operating in the usual manner. As the driving-belt on the cone-pulley N commences to operate on the small end thereof the screw O is made to revolve reversely to the cone-pulley, which causes the arm P to slide toward the large end of the same, carrying the driving-belt with it, and causing the grinder to move in the same direction, but with a speed progressively diminished. When the arm strikes the collar $i'$ the cross-belt is transferred to the loose pulley $k'$, and the straight belt to the fast pulley $k^2$, which causes the screw to turn in the same direction as the cone-pulley N and to move the grinder toward the center of the circular article with progressively faster speed as the belt approaches the smaller end of the cone-pulley.

When straight saws or similar articles are to be ground the circular face-plate is not used, and the article is supported upon a holder and is caused to move up and down past the revolving grinder. In this case a frame, R′, is erected upon the platform of the sliding frame A′ to support the center of the lever-beam $n$, from one end of which the holder is suspended by a strap, $n'$, while the other end of the lever is connected by a strap, $n^2$, with a slide, $m$. This slide passes through a guide, $m^2$, and is connected by a connecting-rod, $m'$, with a crank-pin secured to a cog-wheel, K, that is pivoted upon a stud secured to the platform $A^2$ of the sliding frame. The teeth of this cog-wheel gear into those of a cog-wheel, K′, that is mounted upon the mandrel E′, so that the turning of said mandrel turns the cog-wheel and its crank-pin and causes the holder to move up and down past the grinder. The holder is borne toward the grinder by a yielding-roller bearing, $r$, having its rim encircled by two thick rings of india rubber, so that it constitutes both a roller-bearing and a spring. This roller-bearing is grooved to receive a rib, $h'$, on the back of the holder to guide it in moving up and down.

The holder S is a pattern-holder, made adjustable by being formed of two plates, $s$ and $s$, connected at top by a swiveling hinge turning on a bolt, $t$, and at bottom by keys $u$, and it is fitted with adjusting-screws $v$, for the purpose of changing the thickness of the holder at different parts, and consequently varying the thickness of the article ground upon it. The article to be ground is secured to the holder by a clamp, $x$, and screw $i^3$. This pattern-holder permits the grinding of articles thinner at one edge than the other, or thinner at one end than the other, or with both these peculiarities, and by reversing the article upon the holder, or changing the adjustment of the holder after half the article is ground, the article may be made to taper in opposite directions from the center of its length.

Instead of the adjustable pattern-holder I may use a solid pattern-holder increased in thickness where I wish to grind the saw or other article away. The crank-pin $z$, lever $n$, and their appurtenances constitute the mechanism by which the holder is moved to and fro past the rim of the grinder.

The invention is not limited to the particular devices for securing the face-plate to the mandrel, regulating the positions of the bearings used to bear the article against the grinder, imparting motion to the grinder, varying the relation of the grinder to the article, or traversing the grinder, as equivalent means may be used in their places.

Having thus described the several modes in which I have contemplated the application of the principle of my invention, what I claim as my invention, and desire to secure by Letters Patent, is—

1. The combination, in a grinding-machine, of the following instrumentalities, viz: the revolving grinder, roller-bearing, and spring, substantially as set forth.

2. The combination, in a grinding-machine, of the following instrumentalities, viz: the revolving grinder, bearing for the article, and turning frame for the grinder, substantially as set forth.

3. The combination, in a grinding-machine, of the following instrumentalities, viz: the revolving grinder, traversing carriage for the same, bearing for the article, and mechanism to move the grinder along the surface of the article with varying speed, substantially as set forth.

4. The combination, in a grinding-machine, of the following instrumentalities, viz: the revolving grinder, bearing for the article, and pattern-holder of varying thickness at different parts of its length, substantially as set forth.

5. The combination, in a grinding-machine, of the following instrumentalities, viz: the revolving grinder, bearing for the article, and pattern-holder of varying thickness both lengthwise and crosswise, substantially as set forth.

6. The combination, in a grinding-machine, of the following instrumentalities: the revolving grinder, bearing for the article, and pattern-holder whose thickness at different parts of its length can be varied by adjustment, substantially as set forth.

7. The combination, in a grinding-machine, of the following instrumentalities, viz: the revolving grinder, bearing for the article, and pattern-holder whose thickness at different parts of its length and breadth can be varied by adjusment, substantially as set forth.

8. The combination, in a grinding-machine, of the following instrumentalities, viz: the revolving grinder, bearing for the article, pattern-holder, and spring to maintain a yielding pressure on the article during grinding, substantially as set forth.

9. The combination, in a grinding-machine, of the following instrumentalities, viz: the revolving grinder, bearing for the article, pattern-holder, spring to maintain a yielding pressure on the article during grinding, and mechanism to move the said pattern-holder past the grinder, substantially as set forth.

In testimony whereof I have hereto set my hand.

EMANUEL ANDREWS.

Witnesses:
C. H. RIANHARD,
W. D. BAILEY.